Patented Oct. 23, 1934

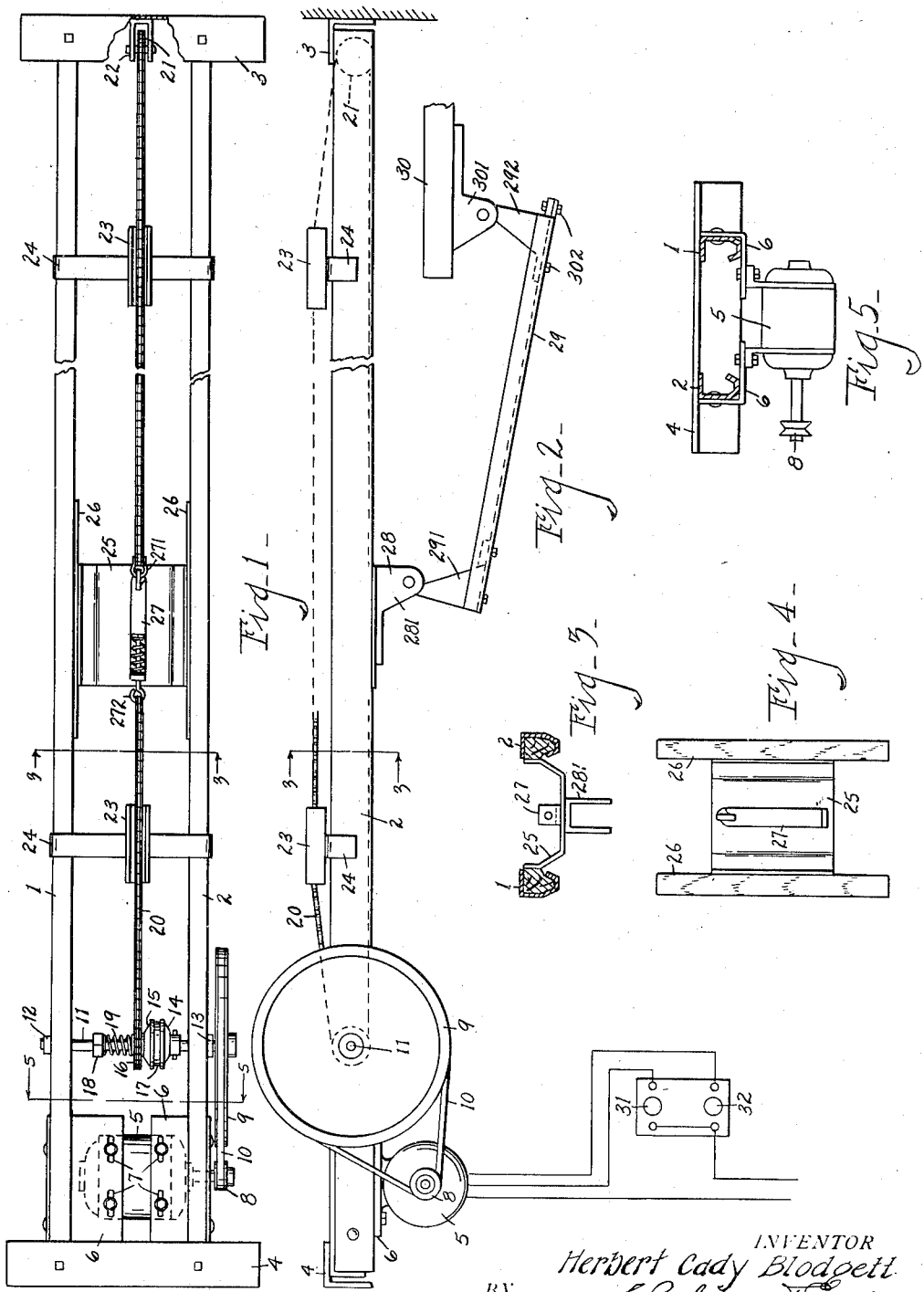

1,978,126

UNITED STATES PATENT OFFICE 1,978,126

DOOR CONTROL

Herbert Cady Blodgett, Hartford City, Ind., assignor to Door Control Company, Hartford City, Ind.

Application September 4, 1930, Serial No. 479,598

9 Claims. (Cl. 268—59)

This invention relates to improved door controls. The control is especially adapted to the control of what is known as an "overhead door", such as is illustrated and appears in Dautrick Patent #1,530,762, issued March 24, 1925, although available for various duties, such as the control of doors and gates generally, or elevators.

The objects of this invention are:

First, to provide a very simple, efficient and inexpensive electric control for such an overhead door.

Second, to provide a very economical gear reduction for such a control.

Third, to provide improved safety clutch connection means therefor.

Objects pertaining to details and economies of construction and operation will appear from the description to follow. A preferred embodiment of my invention is illustrated in the accompanying drawing, in which:

Fig. 1 is a plan view of such a control in broken section.

Fig. 2 is a side elevation view also in broken section, the flexible overhead door being indicated diagrammatically.

Fig. 3 is a cross sectional view on line 3—3 of Figs. 1 and 2, showing details of the track for the control carriage and the end elevation of the carriage.

Fig. 4 is a plan view of the sliding carriage disconnected and removed from the tracks.

Fig. 5 is a detail cross sectional view on line 5—5 of Fig. 1, showing the details of the motor support and of the end construction.

The parts will be identified by their numerals of reference which are the same in all the views.

1 and 2 are oppositely faced, parallel tracks or runways made of channel bars of a form indicated and appearing particularly in cross section in Fig. 3.

3 and 4 are the spreader supports which serve to hold the tracks 1 and 2 in proper relation. 5 is the reversible electric motor which is suspended by means of a pair of angular flanged brackets 6 6 attached to the tracks 1 and 2 with flanges projecting inwardly. These brackets are provided with slotted holes 7 to afford an adjustable mounting for the motor. 8 is the motor pulley which is connected to driven pulley 9 by V-belt 10. This drives shaft 11 which shaft is journaled in roller bearings 12 and 13 in the side rails 1 and 2.

Friction clutch disk 14 is pinned to shaft 11. Clutch disk 15, integral with sprocket wheel 16, is journaled and free to turn on shaft 11, and there is interposed between the clutch disks 14 and 15 a friction disk 17 of woven asbestos or the like. This material used has the trade name "Raybestos".

A screw nut 18 threaded on shaft 11 holds compression spring 19 adjustably against the clutch member. By adjusting the nut 18 the amount of power delivered to the sprocket 16 is effectively regulated. 20 is the sprocket chain disposed over the sprocket wheel 16 and supported at its forward end by sprocket wheel 21 on bracket 22 carried by the front spreader 3. The upper run of the chain is supported on guides 23 carried by cross arms 24 supported by the side rails 1 and 2.

A carriage 25, having runners 26 fitting the tracks, is reciprocated back and forth by the action of the chain 20. The forward end of the chain is connected to bracket 27 on the carriage by eye 271 and its rear end is connected to spring bolt 272, see particularly Fig. 1.

A connecting hinge bracket 28 is secured to the under side of the carriage 25. This has cheek pieces 281 to which is connected door driving link 29 by bracket 291 attached by suitable cap screw and bolt. The forward end of the link 29 is connected by hinge bracket 292 to the counterbalanced door 30 by hinge bracket 301 and bolts 302, see particularly Fig. 2. The link 29 is drilled at the time of installation and the surplus cut off.

The motor 5 is reversible and is controlled by two push buttons 31 to open and 32 to close.

The wiring diagram is indicated at the left of Fig. 2. Push button 31 connects the current to run the motor counter-clockwise, as seen in Fig. 2, and through its connections opens the door. Button 32 controls the reverse movement, or clockwise movement of the motor, and closes the door. It is necessary for the operator to hold down the button until the opening or closing operation is completed.

It will be seen that the structure is provided with an effective safety device in that the friction disks of the clutch can be so set that they merely carry the counterbalanced door, so that a resistance of a very few pounds causes the clutch to slip without doing damage either to the motor, to the door, or to any obstruction, such as an automobile or a person.

It will be seen that by this construction the pair of rails for the carriage constitute the support and framework for the motor and mechanism which is simply suspended by cross spreaders at each end. The motor base serves as the connection between the rails. By providing the clutch that slips on the driven shaft, a very effective and perfect operation is secured.

I desire to claim the structure in the specific form illustrated because it is highly economical to build and I also desire to claim the invention broadly as pointed out in the appended claims.

Having thus described my invention what I claim as new and desire to secure by Letters Patent is:

1. In a door control, the combination of oppositely disposed channel rails, suspending spreaders at the ends thereof, inwardly projecting flanged brackets at one end, a reversible electric motor suspended from said bracket flanges, a driving pulley and a driven pulley having a belt, a driven shaft supporting the driven pulley, a friction clutch disk pinned to the said shaft, an opposite clutch disk member having a sprocket gear wheel journaled on said shaft, a friction disk between the said clutch disk members, a spring on the said shaft and an adjusting nut therefor to control the tension, a sprocket wheel supported by a bracket on the front spreader, a sprocket chain between said sprocket wheels, guides for the upper run thereof, a carriage having runners in said tracks, a bracket on the said carriage having an eye for the front end of the sprocket chain and a spring bolt for the rear end thereof, a connecting bracket hinge member on the under side of the carriage, a counterbalanced door having a hinge member, and a connecting link from the said carriage to the counterbalanced door.

2. In a door control, the combination of oppositely disposed channel rails, suspending spreaders at the ends thereof, inwardly projecting flanged brackets at one end, a reversible electric motor suspended from said bracket flanges, a driving pulley and a driven pulley having a belt, a driven shaft supporting the driven pulley, a friction clutch disk pinned to the said shaft, an opposite clutch disk member having a sprocket gear wheel journaled on said shaft, a friction disk between the said clutch disk members, a spring on the said shaft and an adjusting nut therefor to control the tension, a sprocket wheel supported by a bracket on the front spreader, a sprocket chain between said sprocket wheels, guides for the upper run thereof, a carriage having runners in said tracks, a bracket on the said carriage having an eye for the front end of the sprocket chain and a spring bolt for the rear end thereof, and a connecting link from the said carriage to the counter-balanced door.

3. In a door control, the combination of oppositely disposed channel rails, suspending spreaders at the ends thereof, inwardly projecting flanged brackets at one end, a reversible electric motor suspended from said bracket flanges, a driving pulley and a driven pulley having a belt, a driven shaft supporting the driven pulley, a friction clutch disk pinned to the said shaft, an opposite clutch disk member having a sprocket gear wheel journaled on said shaft, a friction disk between the said clutch disk members, a spring on the said shaft and an adjusting nut therefor to control the tension, a sprocket wheel supported by a bracket on the front spreader, a sprocket chain between said sprocket wheels, guides for the upper run thereof, a carriage having runners in said tracks, and connections from said carriage to actuate a door or the like.

4. In a door control, a unitary structure, comprising the combination of oppositely disposed parallel rails, a reversible electric motor having a driving pulley and having a suitable base disposed between and secured to said rails to constitute the supporting frame, a cross driven shaft mounted upon and carried by the said rails, a driven pulley supported by said cross shaft and belted to said driving pulley, a carriage carried by the said rails and adapted to reciprocate thereon, a sprocket chain means for driving said carriage, a sprocket gear on said cross shaft for said chain, and a slip clutch on said cross shaft for driving said sprocket gear, and a push button switch for the direct circuit and a push button switch for the reverse circuit of said motor.

5. In a door control, a unitary structure, comprising the combination of oppositely disposed parallel rails, a reversible electric motor having a driving pulley and having a suitable base disposed between and secured to said rails to constitute the supporting frame, a cross driven shaft mounted upon and carried by the said rails, a driven pulley supported by said cross shaft and belted to said driving pulley, a carriage carried by the said rails and adapted to reciprocate thereon, a sprocket chain means for driving said carriage, a sprocket gear on said cross shaft for said chain, and a slip clutch on said cross shaft for driving said sprocket gear.

6. In a door control, a unitary structure, comprising the combination of oppositely disposed parallel rails, a reversible electric motor having a driving pulley and having a suitable base disposed between and secured to said rails to constitute the supporting frame, a cross driven shaft mounted upon and carried by the said rails, a driven pulley supported by said cross shaft and belted to said driving pulley, a carriage carried by the said rails and adapted to reciprocate thereon, a sprocket chain means for driving said carriage, and a sprocket gear on said cross shaft for said chain.

7. In a door control, a unitary structure, comprising the combination of oppositely disposed parallel rails, a reversible electric motor having a driving pulley and having a suitable base disposed between and secured to said rails to constitute the supporting frame, a cross driven shaft mounted upon and carried by the said rails, a driven pulley supported by said cross shaft and belted to said driving pulley, a carriage carried by the said rails and adapted to reciprocate thereon, a sprocket chain means for driving said carriage, a sprocket gear on said cross shaft for said chain, and a push button switch for the direct circuit and a push button switch for the reverse circuit of said motor.

8. In a door control, the unitary structure comprising the combination of oppositely disposed parallel rails, a carriage adapted to traverse said rails with connections to the door to be controlled, a reversible electric motor having a suitable base disposed between and secured to said rails to constitute the supporting frame for the structure, a countershaft disposed across and carried by said rails, an endless sprocket chain means for driving said carriage, a sprocket gear on said cross shaft for driving said endless chain, a slip friction clutch between said motor and sprocket gear, and a push button switch for the direct circuit to drive said motor in one direction and a push button switch for the reverse circuit of said motor to drive said motor in the reverse direction.

9. In a door control, the unitary structure comprising the combination of oppositely disposed parallel rails, a carriage adapted to traverse said rails with connections to the door to be controlled, a reversible electric motor having a suitable base disposed between and secured to said rails to constitute the supporting frame for the structure, a countershaft disposed across and carried by said rails, an endless sprocket chain means for driving said carriage, a sprocket gear on said cross shaft for driving said endless chain, and a slip friction clutch between said motor and said sprocket gear.

HERBERT CADY BLODGETT.